United States Patent
Bohm et al.

[15] 3,706,365
[45] Dec. 19, 1972

[54] CLUTCH OPERATOR WITH HYDROSTATIC BEARINGS

[72] Inventors: Heinz-Dieter Bohm, 475 Unna; Wolfgang Muller; Herbert Hobert, both of 475 Unna-Massen, all of Germany

[73] Assignee: Maschinenfabrik Stromag G.m.b.H., Unna, Germany

[22] Filed: May 17, 1971

[21] Appl. No.: 122,330

[30] Foreign Application Priority Data

May 21, 1970 Germany.................P 20 24 639.3

[52] U.S. Cl. ........192/85 CA, 192/110 B, 192/113 B, 308/9
[51] Int. Cl.............................................F16d 25/08
[58] Field of Search ..192/85 CA, 85 A, 85 R, 113 B, 192/110 B, 86; 308/36.3, 9

[56] References Cited

UNITED STATES PATENTS

| | | | |
|---|---|---|---|
| 3,429,410 | 2/1969 | Hansen | 192/85 CA |
| 3,444,971 | 5/1969 | Davidson | 192/85 CA |
| 3,472,565 | 10/1969 | Arneson | 308/9 |
| 3,563,618 | 2/1971 | Ivanov | 308/9 |
| 3,613,848 | 10/1971 | Reiff | 192/85 CA |

*Primary Examiner*—Benjamin W. Wyche
*Attorney*—Erwin Salzer

[57] ABSTRACT

A coupling having a pair of coupling members and axially movable means for selectively establishing a torque-transmitting relation between said pair of coupling members and for disconnecting said pair of coupling members so that the driving coupling member does not any longer drive the driven coupling member. The aforementioned axially movable means are operated by a fluid motor. A hydrostatic bearing is interposed between the aforementioned axially movable means and the fluid motor. The coupling is provided with additional hydrostatic bearings for receiving and balancing axial forces and for receiving and balancing radial forces inherent in the operation of the coupling.

11 Claims, 2 Drawing Figures

PATENTED DEC 19 1972 3,706,365

INVENTORS
Heinz-Dieter BÖHM
Wolfgang MÜLLER
Herbert HOBERT

3,706,365

CLUTCH OPERATOR WITH HYDROSTATIC BEARINGS

BACKGROUND OF THE INVENTION

The operation of couplings, or clutches, having members which may either be in a torque-transmitting relation, or in a non-torque-transmitting relation, involves often large forces which must be received by appropriate bearing structures, e.g. ball bearings, or roller bearings. The use of such bearings greatly contributes to the bulk of a coupling, and their use limits wherever the coupling is subject to space limitations the power which can be transmitted by it. Moreover, couplings being provided with ball bearings or roller bearings, are subject to limitations in regard to the number of revolutions at which the coupling can be operated.

The use in couplings of sleeve bearings lubricated by oil films is likewise subject to serious limitations. Such bearings are normally only capable of being subjected to limited forces. If the forces occurring in the coupling are exceeded, this may call for an increase of the size of the bearings to such an extent as to become impracticable. Such an increase may become unavoidable since oil-lubricated sleeve bearings are subject to limitations in regard to the amount of pressure admissible per unit of bearing area. Sleeve bearings lubricated by oil films can only be applied up to a certain ceiling in regard to number of revolutions. When this ceiling is reached, or exceeded, the formation of a protective oil film is impaired, and the rate of wear and tear becomes unacceptable.

SUMMARY OF THE INVENTION

In couplings embodying this invention the forces inherent in the operation of the couplings are received and balanced by hydrostatic bearings, i.e. bearings formed by a cushion of liquid under pressure, this cushion being interposed between relatively movable parts of the couplings, precluding their physical engagement, and minimizing wear and tear, even if the number of revolutions is very high.

DESCRIPTION OF PREFERRED EMBODIMENT

Figure 1:
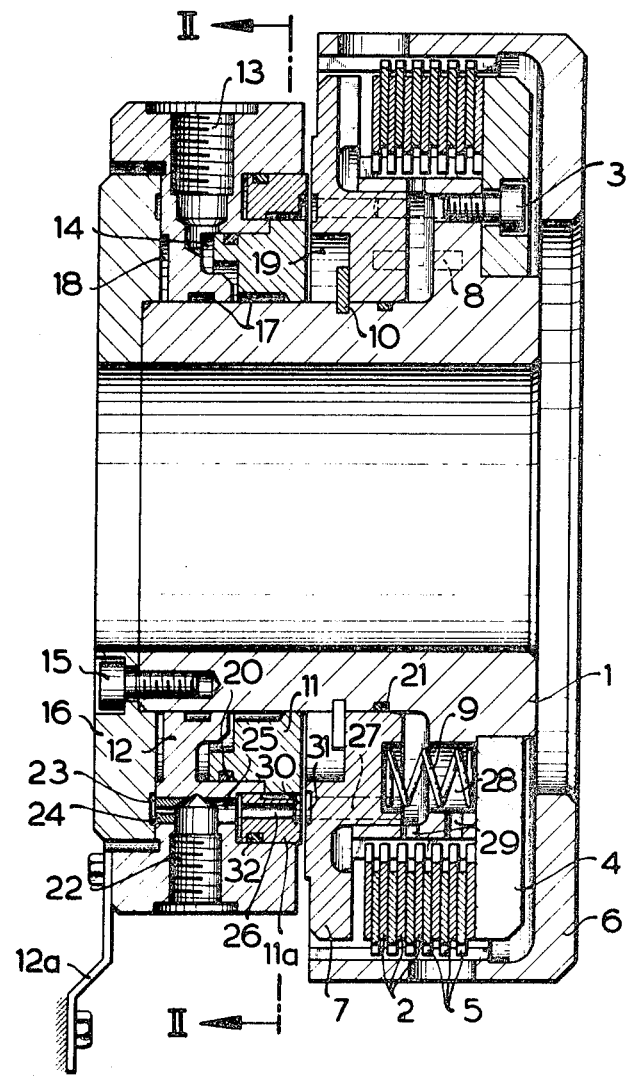
FIG. 1 is a longitudinal section of a coupling embodying this invention.
Figure 2:
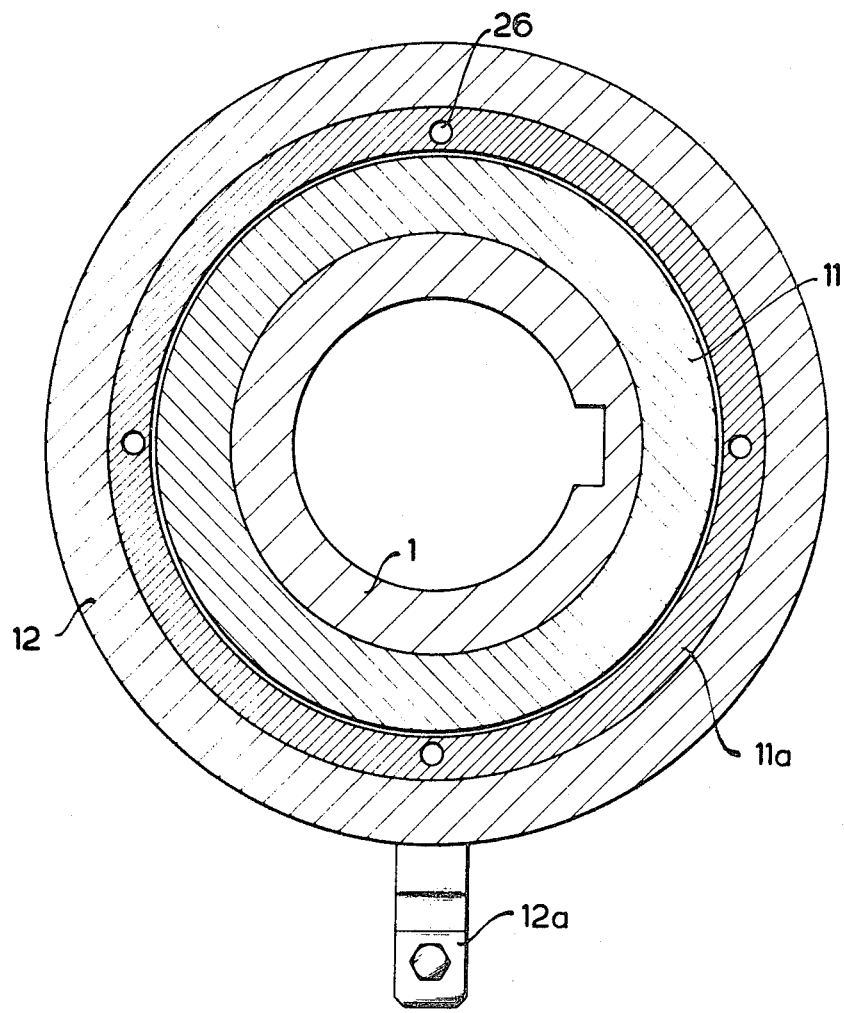
FIG. 2 shows the same structure as FIG. 1 in a section taken along II—II of FIG. 1.

In the drawings reference numeral 1 has been applied to indicate a sleeve-shaped or hub-shaped coupling member having a central axial bore intended to receive a shaft (not shown) supporting the member 1. Coupling member 1 and its supporting shaft are tied together in such a way as to preclude relative rotation between these parts, e.g. member 1 may be keyed to its supporting shaft. Coupling member 1 supports a stack of annular torque-transmitting coupling laminations 2. The axial movement of the stack of laminations 2 is limited by an abutment plate 4. The latter is affixed to member 1 by means of axial screws 3 arranged in a circular pattern. The radially inner laminations 2 and radially outer laminations 5 are interleaving, and the latter are supported by annular coupling member or lamination support 6 which is substantially L-shaped in cross-section. The stacks of laminations 2 and 5 are allowed to move axially to some extent, but laminations 2 are precluded from performing any rotary motions relative to member 1, and laminations 5 are precluded from performing any rotary motions relative to annular support 6. In this connection reference may be had to U.S. Pat. No. 3,441,110 to Werner Rüggen, Apr. 29, 1969 for DISC COUPLING OPERATED BY FLUID PRESSURE. This patent discloses more in detail couplings of the type to which the instant invention relates. The coupling member or annular support 6 is arranged in coaxial relation to part 1 and intended to be affixed to a part to be selectively driven by the shaft on which member 1 is mounted, or to be maintained at a standstill. The annular clamping member 7 is slidably mounted on member 1, and adapted to compress the stacks of interleaving laminations 2,5. In one limit position of clamping member 7 there is no pressure between laminations 2 and 5, and then no torque is transmitted from the shaft upon which coupling member 1 is mounted to annular lamination support 6. In the other limit position of clamping member 7 laminations or discs 2 and 5 are axially compressed, and then a torque is transmitted from the shaft upon which member 1 is mounted to annular lamination support 6.

Reference character 8 has been applied to indicate pins arranged parallel to the shaft supporting coupling member 1. One end of pins 8 projects loosely into a cylindrical recess provided in member 1, and the opposite end of pins 8 projects loosely into a cylindrical recess provided in clamping member 7. Thus pins 8 allow a relative axial movement of parts 7 and 1, but preclude any relative rotary movement thereof.

Reference character 9 has been applied to indicate helical compression springs tending to increase the gap formed between parts 4 and 7, and thus to minimize friction between the radially inner laminations 2 and the radially outer laminations 5. It will thus be understood that springs 9 are uncoupling springs whose function consists in rendering the coupling ineffective, whenever desired, i.e. to preclude transmission of torques between parts 1 and 6. The maximum spacing of annular clamping member 7 from abutment plate 4 is determined by an annular abutment 10 inserted into a conforming groove provided in member 1.

The annular clamping member 7 may be moved in the direction for compressing laminations 2,5 against the bias of springs 9 by means of a first annular piston 11. Piston 11 is slidably arranged in a part to which reference character 12 has been applied. This part is itself an annular piston, and it forms a cylinder body for receiving the annular piston 11. Thus part 12 surrounds part 11. The annular cylinder body 12 defines a pressure medium admitting duct to which reference character 13 has been applied. The pressure medium admitted to duct 13 is generally oil, though some other appropriate liquid may be used as a pressure medium. Piston 11 and cylinder body 12 form a gap therebetween for the flow of the pressure medium, or pressure fluid. The structure is further provided with an abutment plate 16 for the cylinder body 12. This plate 16 is affixed to hub member 1 by means of screws 15. Upon admission of fluid under pressure through duct 13 only piston 11 is capable of moving axially, cylinder body 12 being stopped by abutment plate 16. Axial movements of piston 11 from left to right are transmitted to annular clamping member 7, resulting in compression of laminations 2 and 5 and transmission of torques between parts 1 and 6.

While piston 11 and cylinder body 12 are allowed to move relatively in axial direction, relative rotary motions of parts 11 and 12 ought to be precluded. This may be achieved by axially extending pin means (not shown) having ends projecting loosely into bores provided in piston 11 and cylinder body 12, and thus performing in substantially the same fashion as the above referred-to pins 8.

Cylinder body 12 is precluded by appropriate means from rotating jointly with other rotating parts of the coupling in order to allow radial admission of pressure fluid through pressure medium admitting duct 13.

The hub-like portions of piston 11 and of cylinder body 12 adjacent coupling member 1 are provided with annular grooves 17 forming pressure-fluid-receiving chambers. The end surface of annular cylinder body 12 juxtaposed to abutment plate 16 is provided with an annular recess 18 forming another pressure-fluid-receiving chamber. The surface of annular clamping member 7 adjacent the right end surface of piston 11 defines an annular recess 19 of which one side is engaged by the aforementioned abutment ring 10.

Fluid under pressure may be admitted from duct 13 through the gap 14 formed between parts 11,12 and through axial gaps formed between coupling member 1 and the hub-like portions of parts 11, 12 to the annular fluid-receiving chambers formed by recesses 17,18 and 19. The fluid under pressure inside of recesses 17,18,19 forms hydrostatic bearings.

The fine annular gaps formed between member 1 and the hub portion of parts 11,12 ought to be so narrow as to achieve a significant fluid throttling effect.

The cross-sectional areas of recesses 18 and 19 ought to be equal and to be 1 to 8 percent larger than the area of cylinder piston unit 11,12 effective in axial direction. The magnitude of the first mentioned cross-sectional areas depends upon the nature of the pressure medium (oil) which is used, and the number of revolutions performed by parts 7 and 16 relative to parts 11 and 12.

Upon admission of oil under pressure to pressure medium admitting duct 13, an annular cushion of oil under pressure is formed between parts 12 and 16. The pressure of oil admitted to duct 13 causes annular piston 11 to move in the direction against annular clamping member 7, causing the latter to be displaced, or moved, in axial direction. There is, however, no physical engagement between parts 7 and 11 on account of the formation of a cushion of fluid under pressure inside of recess 19, physically separating parts 7 and 11. This minimizes friction and wear and tear, even if the number of revolutions of the coupling is large. Upon release of the pressure operating the coupling, uncoupling springs 9 move parts 7 and 11 in axial direction, from right to left, thus relieving interleaving laminations 2 and 5 of pressure.

Reference numeral 20 has been applied to indicate a piston ring or annular seal interposed between piston 11 and cylinder body 12, and reference numeral 21 has been applied to indicate an annular seal interposed between coupling member 1 and annular clamping member 7. These seal means 20,21 are required to preclude leakage of fluid under pressure, and consequent loss of pressure.

Reference character 22 has been applied to indicate an admission passageway for a cooling medium in addition to the medium admitted to duct 13. The cooling medium admitted to passageway means 22 may be at a lower pressure than that admitted at 13 and used to form hydrostatic cushions or bearings in addition to its function as a cooling medium. The passageway 22 in annular part 12 communicates with an annular recess 23 formed in abutment plate 16. A screw or needle valve 24 controls the flow of liquid from passageway 22 to annular recess 23 and to a duct 25.

In order to cool the laminations 2 and 5, cooling medium must be conducted from passageway 22 across slidable clamping member 7 to laminations, or discs 2 and 5. This calls for the provision of means for preventing the formation of any gap of significant length in the path of liquid from passageway 22 to laminations or discs 2 and 5, even if clamping member 7 is moved by piston 11 away from fixed cylinder body 12.

To achieve the above ends, the piston 11 is provided with an auxiliary piston, or sub-piston 11a which is slidable inside of cylinder body 12 and relative to parts 11 and 12 and has an axial bore 26 for the passage of cooling fluid to laminations 2 and 5. The passageway 25 in annular part 12 interconnects the cooling fluid admission passageway 22 with the axial bore 26 in auxiliary piston 11a. The annular clamping member 7 is provided with a bore 27 arranged in coaxial relation to the bore 26 in auxiliary piston 11a. Reference character 28 has been applied to indicate a chamber or cavity connected to passageway 22 by means of bores 25,26 and 27. The chamber or cavity 28 communicates by means of bores or passageways 29 with a space around laminations 2 and 5, thus admitting cooling fluid to the latter.

The annular clamping member 7 and the auxiliary piston 11a are provided at their juxtaposed surface with annular recesses 31 and 30, respectively. These recesses form annular chambers establishing a cushion of cooling fluid or hydrostatic bearing between parts 7 and 11a.

The auxiliary piston 11a is provided with a piston ring or seal 32 whose radially outer surface engages the cylinder body 12.

The above arrangement makes it possible to supply cooling medium to laminations or discs 2 and 5 without subjecting the annular piston 11 to the pressure of the cooling medium. The radius determining the amount of friction between piston 11 acted upon by the pressure fluid and clamping member 7 — which radius is substantially equal to the median value of the inner and of the outer radius of annular piston 11 — is relatively small. The radius determining the friction between auxiliary piston 11a acted upon by the cooling medium and clamping member 7 — which radius is substantially equal to the median value of the inner and the outer radius of auxiliary piston 11a — is relatively large. The pressure to which the cooling medium is subjected may be less than the pressure of the pressure fluid needed to move piston 11 and to overcome the bias of springs 9. The relatively small radius of piston 11 subjected to a relatively high pressure and the relatively large radius of auxiliary piston 11a subjected to a relatively small pressure is a desirable combination tending to minimize friction.

It will be apparent from FIG. 1 that a narrow lateral gap is left between the radially outer cylindrical surface of piston 11 and the radially inner cylindrical surface of auxiliary piston 11a. As a result, parts 11 and 11a are not loaded down by mutual frictional engagement.

The area of the annular clamping member 7 on the side thereof adjacent to cavity 28 is relatively large, and the pressure of the cooling medium admitted through passageway 22 acts upon this relatively large area. As a result, the pressure of the cooling medium tends to significantly increase the bias of helical springs 9. This, in turn, makes it possible to instantly remove the clamping pressure upon laminations 2 and 5 when it is desired to stop coupling member 1 from driving coupling member 6.

The auxiliary piston 11a is preferably annular, but must not necessarily be annular. One or more relatively small auxiliary pistons may be substituted for the single annular auxiliary piston 11a shown, and such auxiliary piston may have a cross-section in the shape of a sector of a circle, or have a circular cross-section.

A true hydrostatic bearing calls for a point of restricted cross-sectional area in its supply line. The narrow annular gaps formed between rotating hub member, or coupling member, 1 and the hub portions of non-rotating cylinder body 12 and non-rotating piston 11, are points of restricted cross-sectional area formed in the line supplying both cavities 17 and cavity 18 with fluid under pressure.

Parts 7 and 16 are both clamping members or abutment plates, the former being axially movable and the latter not being axially movable.

It is important to preclude any physical engagement between pistons 11 and 11a, on the one hand, and annular clamping member 7, on the other hand. Such a physical engagement would defeat the very purpose of the present invention, i.e. the separations of parts 11, 11a and 7 by a cushion of liquid under pressure, or a hydrostatic bearing. To achieve this end the area of recess 19 for forming a cushion of fluid under pressure between piston 11 and clamping member 7, and the area of recess 18 for forming a cushion of fluid under pressure between cylinder body 12 and abutment plate 16, are each slightly larger than the juxtaposed areas of piston 11 and cylinder body 12. The aforementioned difference ought preferably to be in the order of 1 to 8 percent.

If the pressure of the pressure medium admitted to duct 13 were ever allowed to drop to zero while the shaft on which coupling member 1 is mounted is rotating, piston 11 might frictionally engage annular clamping member 7 and this might cause damage to the coupling. In order to avoid such damage, the pressure of fluid or liquid admitted to duct 13 should never be less than a predetermined minimum value. This minimum fluid pressure must be sufficiently large to overcome the bias of helical spring means 9 and any other force acting in the same direction, and thus to maintain parts 11 and 7 out of engagement in slightly spaced relation. The aforementioned minimum force is not sufficient to cause engagement under pressure of parts 7, 2, 5 and 4.

It will be apparent from the above that the fluid admitted to duct means 13 has preferably a higher pressure than the fluid admitted to duct means 22. The former fluid has the function of operating the coupling and the latter fluid has the dual function of cooling interleaving laminations or discs 2, 5 and of providing a supplementary force for overcoming the bias of helical springs 9 to cause physical engagement under pressure of parts 7, 2, 5 and 4.

As mentioned above the pressure of fluid admitted to duct means 13 should not be allowed to drop to zero, or below a predetermined minimum value, as long as the shaft upon which coupling member, or hub member, 1 is mounted is rotating. This is true if the optional auxiliary piston 11a and the optional annular recesses 30, 31 and 33 for forming a pair of auxiliary hydrostatic bearings are deleted. The presence of the aforementioned optional or non-mandatory features makes it possible to allow the pressure of fluid admitted to duct means 13 to take any desired minimum value, as long as it is not desired to clamp parts 7, 2, 5 and 4 together. If the pressure of the cooling medium admitted to duct means 22 is maintained sufficiently high to cause formation of hydrostatic bearings in annular grooves 30, 31 and 23, maintaining clamping member 7 in spaced relation from the annular end surfaces of pistons 11a and 11, the supply of fluid under pressure to duct means 13 may be cut off, though the shaft on which hub, or coupling member, 1 is mounted is rotating.

It will be understood that the high pressure medium admitted to duct means 13 and the low pressure medium admitted to duct means 22 are recirculated upon escaping from the coupling structure, and re-admitted to duct means 13 and 22, thus forming two closed circular flows of liquid.

It should be mentioned further that part 12 can be kept stationary by connecting it to a retainer bracket 12a to a stationary machine element.

We claim as our invention:

1. A hydraulically operated coupling including
   a. a first rotatable coupling member (1);
   b. a first stack of laminations (2) arranged in coaxial relation to said first coupling member and jointly rotatable with said first coupling member;
   c. a second rotatable coupling member (6);
   d. a second stack of laminations (5) arranged in coaxial relation to said second coupling member (6) and jointly rotatable with said second coupling member (6) and movable in axial direction relative to said second coupling member (6), the constituent laminations of said first stack and of said second stack (2,5) being arranged to interleave;
   e. means (9) for separating the constituent laminations of said first stack and of said second stack to preclude transmission of torques from said first coupling member (1) to said second coupling member (6);
   f. an axially movable clamping member (7) for compressing the constituent laminations of said first stack (2) and of said second stack (5) to cause transmission of torques from said first coupling member (1) to said second coupling member (6);
   g. hydraulic means for operating said clamping member (7), said hydraulic means including a substantially annular fixed cylinder body (12) and a substantially annular piston (11) movable axially within said cylinder body (12) and precluded from rotating relative to said cylinder body (12), said cylinder body (12) and said piston (11) being both arranged in coaxial relation to and mounted on said first coupling member (1), and duct means (13) for admitting a fluid under pressure to said cylinder body (12) to cause movement of said piston (11) inside said cylinder body (12) relative to said cylinder body (12);

h. means (19) forming a first hydrostatic bearing interposed between said clamping member (7) and said piston (11) allowing rotation of said clamping member (7) relative to said piston (11);

i. means (17) forming a second hydrostatic bearing interposed between said piston (11) and said first coupling member (1) allowing rotation of said first coupling member (1) relative to said piston (11);

j. an annular abutment plate (16) affixed to said first coupling member (1) and jointly rotatable with said first coupling member (1), said abutment plate (16) and said cylinder body (12) defining means (18) forming a third hydrostatic bearing interposed between said cylinder body (12) and said abutment plate (16) allowing rotation of said abutment plate (16) relative to said cylinder body (12);

k. said cylinder body (12) and said first coupling member (1) defining means (17) forming a fourth hydrostatic bearing interposed between said cylinder body (12) and said first coupling member (1) allowing rotation of said first coupling member (1) relative to said cylinder body (12); and l. the axially inner end surfaces of said cylinder body (12) and of said piston (11) defining an annular restricted passageway means (14) for admitting fluid under pressure from the inside of said cylinder body (12) to said first and to said second hydrostatic bearing and said cylinder body (12) and said first coupling member (1) defining annular narrow gaps for admitting fluid under pressure to said third and to said fourth hydrostatic bearing.

2. A hydraulically operated coupling including
a. a first rotatable coupling member (1);
b. a first stack of laminations (2) arranged in coaxial relation to said first coupling member and jointly rotatable with said first coupling member (1);
c. a second rotatable coupling member (6);
d. a second stack of laminations (5) arranged in coaxial relation to said second coupling member (6) and jointly rotatable with said second coupling member (6) and movable in axial direction relative to said second coupling member (6), the constituent laminations of said first stack and of said second stack (2,5) being arranged to interleave;
e. means for separating the constituent laminations of said first stack and of said second stack to preclude transmission of torques from said first coupling member (1) to said second coupling member (6);
f. an axially movable clamping member (7) for compressing the constituent laminations of said first stack (2) and of said second stack (5) to cause transmission of torques from said first coupling member (1) to said second coupling member (6);

g. hydraulic means for operating said clamping member (7), said hydraulic means including a substantially annular fixed cylinder body (12) and a substantially annular piston (11) movable axially within said cylinder body (12) and precluded from rotating relative to said cylinder body (12), said cylinder body (12) and said piston (11) being both arranged in coaxial relation to and mounted on said first coupling member (1), and duct means (13) for admitting a fluid under pressure to said cylinder body (12) to cause movement of said piston (11) inside said cylinder body (12) relative to said cylinder body (12);

h. the surface of said clamping member (7) juxtaposed to one of the end surfaces of said piston (11) having an annular recess (19) for receiving a cushion of fluid under pressure separating said clamping member (7) from said piston (11);

i. the end surface of said cylinder body (12) adjacent said abutment plate (16) having a recess (18) for receiving a cushion of fluid under pressure separating said cylinder body (12) from said abutment plate (16);

j. said cylinder body (12) and said piston (11) each being provided with an annular groove (17) in the surfaces thereof adjacent said first coupling member (1) for receiving cushions of fluid under pressure separating said cylinder body (12) and said piston (11) from said first coupling member (1); and k. said cylinder body (12) and said piston (11) defining restricted passageway means (14) for admitting fluid under pressure from said cylinder body (12) to said annular recess (19) in said clamping member (7) and to said annular groove (17) in said piston (11), and said cylinder body (12) and said first coupling member (1) defining restricted annular gaps for admitting fluid under pressure to said annular groove (17) in said cylinder body (12) and to said recess (18) in said abutment plate (16).

3. A hydraulically operated coupling as specified in claim 2 wherein the area of said recess (19) for forming a cushion of fluid under pressure between said piston (11) and said clamping member (7) and the area of said recess (18) for forming a cushion of fluid under pressure between said cylinder body (12) and said abutment plate (16) are each slightly larger than the juxtaposed immediately adjacent areas of said piston (11) and of said cylinder body (12).

4. A hydraulically operated coupling as specified in claim 3 wherein said cylinder body (12) is provided with a means (22) for admission of a cooling fluid in addition to said means (13) for admitting a fluid under pressure to said cylinder body, and wherein juxtaposed surfaces of said cylinder body (12) and of said abutment plate (16) and juxtaposed surfaces of said piston (11) and of said clamping member (7) are provided with hydrostatic bearing forming means (23,30,31) communicating with said means for admission of cooling fluid.

5. A hydraulically operated coupling as specified in claim 4 including means for establishing a point of restricted cross-sectional area (24) interposed between said means (22) for admission of a cooling fluid and said hydrostatic bearing forming means (23,30,31).

6. A hydraulically operated coupling as specified in claim 4 wherein said cylinder body (12), said piston (11) and said clamping member (7) define serially related passageways (25,26,27) supplying cooling fluid to said first stack of laminations (2) and to said second stack of laminations (5) and wherein hydraulic bearing forming means (31,31) are arranged in series with said passageways (25,26,27).

7. A hydraulically operated coupling as specified in claim 6 including an annular auxiliary piston (11a) arranged in coaxial relation to said cylinder body (12) and to said piston (11) and axially movable relative to said piston (11), said auxiliary piston (11a) defining a passageway (26) serially related to passageways (25,27) defined by said cylinder body (12) and by said clamping member (7) for supplying cooling fluid to said first stack of laminations (2) and to said second stack of laminations (5).

8. A hydraulically operated coupling including
a. a first shaft-mounted hub-shaped coupling member (1);
b. a second rotatable coupling member (6) arranged in coaxial relation to said first coupling member (1);
c. axially movable means (7) mounted on and jointly rotatable with said first coupling member (1) for selectively establishing a torque-transmitting relation between said first coupling member (1) and said second coupling member (6);
d. a non-rotatable axially movable annular piston (11) arranged in coaxial relation to and mounted upon said first coupling member (1) for operating said axially movable torque-transmission establishing means (7), said piston defining a first annular recess (17) juxtaposed to the radially outer surface of said first coupling member (1);
e. a non-rotatable annular cylinder body (12) receiving said annular piston (11) arranged in coaxial relation to and mounted upon said first member (1), said cylinder body (12) defining duct means (13) for admitting a fluid under pressure to the space inside of said cylinder body (12) and to one of the end surfaces of said piston (11), said cylinder body (12) defining a second annular recess (17) juxtaposed to said radially outer surface of said first coupling member (1);
f. said axially movable means (7) forming an annular cavity (19) coaxial with said annular piston (11) and juxtaposed to an axially outer end surface of said piston (11) supplied with fluid under pressure from said duct means (13) to establish a hydrostatic bearing interposed between said annular piston (11) and said axially movable means (7); and
g. the axially inner surface of said annular piston (11) and of said annular cylinder body (12) defining a restricted passageway (14) for supplying fluid under pressure to said radially outer surface of said hub-member (1) and to said first annular recess (17) and to said second annular recess (17).

9. A coupling as specified in claim 8 wherein
a. said first coupling member (1) is provided with an abutment plate (16) jointly rotatable with said first coupling member and arranged on the side of said cylinder body (12) remote from said piston (11); and wherein
b. said abutment plate (16) and said cylinder body (12) jointly define an annular cavity (18) at juxtaposed sides thereof supplied with fluid under pressure through a narrow annular gap formed between said first coupling member (1) and said cylinder body (12).

10. A coupling as specified in claim 8 wherein
a. the side of said cylinder body (12) remote from said piston (11) is provided with an annular recess (18) coaxial to said cylinder body and having a predetermined area substantially equal to the area of said annular cavity (19) formed between said other end surface of said annular piston (11) and said torque-transmission establishing means (7); and
b. wherein the area of said annular recess (18) and the area of said annular cavity (19) slightly exceed the effective axially inner area of said piston (11) and of said cylinder body (12).

11. A coupling as specified in claim 8 wherein
a. said cylinder body (12) is provided with a pair of fluid admission passageway means (13,22), one (22) of said pair of fluid admission passageway means (13,22) communicating with a space housing stacks of interleaving torque-transmission laminations (2,5); wherein
b. an annular auxiliary piston (11a) is arranged in coaxial relation to said cylinder body (12) and to said piston (11) and axially movable relative to said said cylinder body (12) and to said piston (11), one of the end surfaces of said auxiliary piston (11a) being arranged to be acted on by fluid under pressure admitted to said cylinder body through said one (22) of said pair of fluid admission passageway means (13,22), said auxiliary piston (11a) further having a passageway (26) extending from said one of the end surfaces to the other of the end surfaces thereof and arranged to supply fluid under pressure from said one of the end surfaces to the other of the end surfaces of said auxiliary piston (11a); wherein
c. means for establishing a first annular hydrostatic bearing are arranged on the side of said auxiliary piston (11a) remote from said cylinder body (12) and supplied with fluid under pressure through said passageway (26) of said auxiliary piston (11a); and wherein
d. means for establishing a second annular hydrostatic bearing are arranged on the side of said cylinder body (12) remote from said auxiliary piston (11a) and supplied with fluid under pressure from said one (22) of said pair of fluid admission passageway means (13,22), said second hydrostatic bearing having substantially the same diameter as said first hydrostatic bearing and being arranged in coaxial relation to said first hydrostatic bearing.

* * * * *